United States Patent
Yang

(10) Patent No.: US 10,803,767 B2
(45) Date of Patent: Oct. 13, 2020

(54) SYSTEM FOR EDUCATIONAL COMPUTER PROGRAMMING

(71) Applicant: Genius Toy Taiwan Co., Ltd., Taichung (TW)

(72) Inventor: Yi-Ming Yang, Taichung (TW)

(73) Assignee: Genius Toy Taiwan Co., Ltd., Taichung (TW)

(*) Notice: Subject to any disclaimer, the term of this patent is extended or adjusted under 35 U.S.C. 154(b) by 326 days.

(21) Appl. No.: 15/996,644

(22) Filed: Jun. 4, 2018

(65) Prior Publication Data

US 2019/0228676 A1 Jul. 25, 2019

(30) Foreign Application Priority Data

Jan. 25, 2018 (TW) .............................. 107102688 A

(51) Int. Cl.
*G09B 19/00* (2006.01)
*G09B 5/02* (2006.01)
*G05B 19/042* (2006.01)

(52) U.S. Cl.
CPC ..... *G09B 19/0053* (2013.01); *G05B 19/0426* (2013.01); *G09B 5/02* (2013.01); *G05B 2219/23291* (2013.01); *G05B 2219/25294* (2013.01)

(58) Field of Classification Search
CPC ........ A63H 30/04; A63H 17/32; A63H 17/40; G09B 19/00
See application file for complete search history.

(56) References Cited

U.S. PATENT DOCUMENTS

| 8,747,182 B2 * | 6/2014 | Sofman | A63H 17/40 446/456 |
| 2013/0095726 A1 * | 4/2013 | Sofman | A63H 17/32 446/397 |

OTHER PUBLICATIONS

Kubo's Coding toy available online at https://www.youtube.com/watch?v=bM9y4JB22NY (published Jan. 29, 2017) (Year: 2017).*

* cited by examiner

*Primary Examiner* — James S. McClellan
(74) *Attorney, Agent, or Firm* — Birch, Stewart, Kolasch & Birch, LLP

(57) ABSTRACT

A system includes a mobile unit, road and procedure pieces, and a controller on the mobile unit that includes an optical sensor, a storage storing instructions and identification lookup tables, and a processor connected to the optical sensor and the storage. The optical sensor scans recognition patterns on the procedure pieces and identification patterns on the road pieces to correspondingly obtain recognition and identification codes. The processor controls the mobile unit to perform actions based on a collection of instructions generated according to the recognition codes and the instruction lookup table and based on entries of coordinate information obtained according to the identification codes and the identification lookup table.

8 Claims, 18 Drawing Sheets

| Basic syntax (Instruction) | | Advanced syntax (Instruction + Number N) | |
|---|---|---|---|
| ⇦ | Step one piece forward | ⇦ 3 | • Step forward N number of pieces when N = 1 to 9; idle when N = 0<br>• E.g., step forward three pieces |
| ⇨ | Step one piece backward | ⇨ 3 | • Step backward N number of pieces when N = 1 to 9; idle when N = 0<br>• E.g., step backward three pieces |
| ↺ | Rotate 90 degrees clockwise | ↺ 3 | • Rotate 90 degrees clockwise N number of times when N = 1 to 9; idle when N = 0<br>• E.g., rotate 90 degrees clockwise three times (i.e., rotate 270 degrees clockwise in total) |
| ↻ | Rotate 90 degrees counterclockwise | ↻ 3 | • Rotate 90 degrees counterclockwise N number of times when N = 1 to 9; idle when N = 0<br>• E.g., rotate 90 degrees counterclockwise three times (i.e., rotate 270 degrees counterclockwise in total) |
| ⧖ | Pause for one second | ⧖ 3 | • Pause for N number of seconds, where N = 0 to 9<br>• E.g., pause for three seconds |

FIG.12

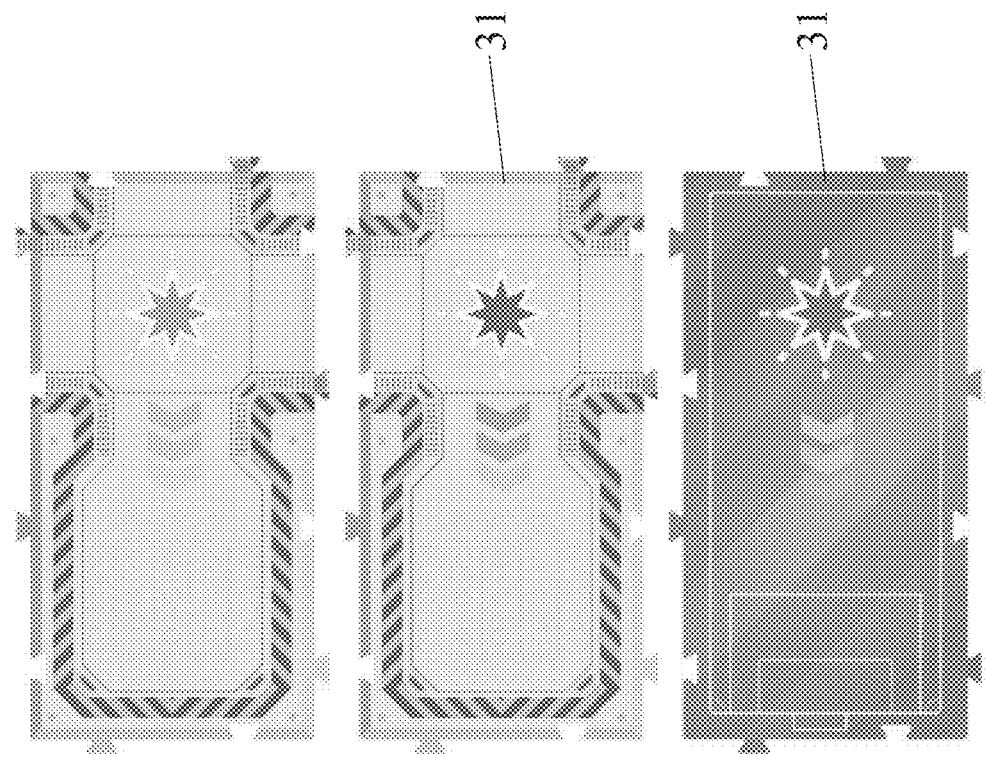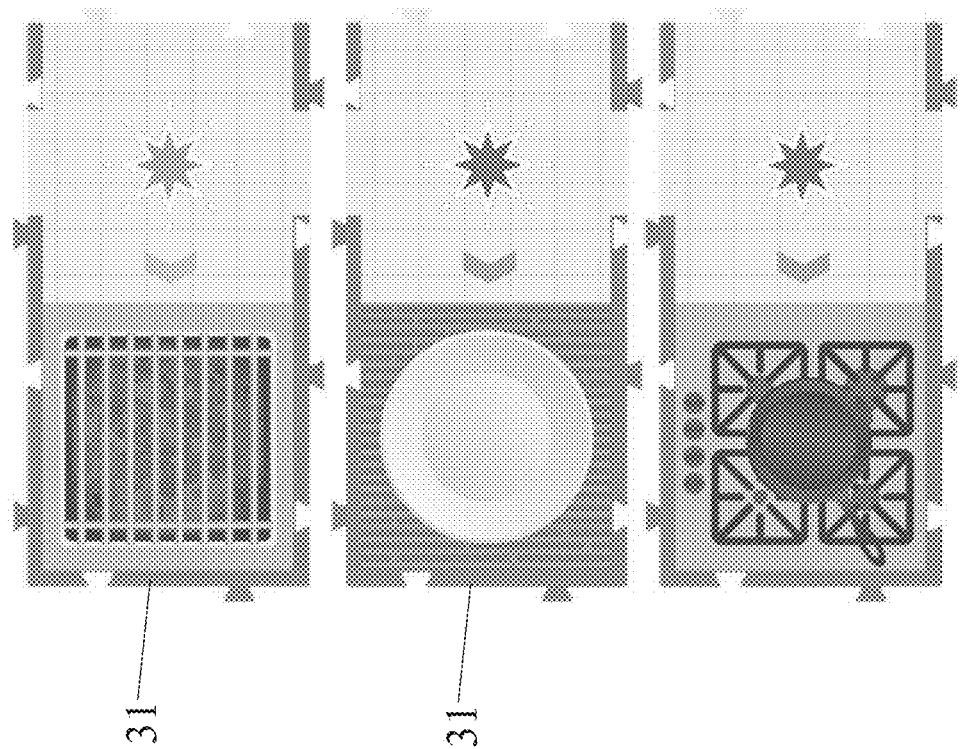
FIG. 13

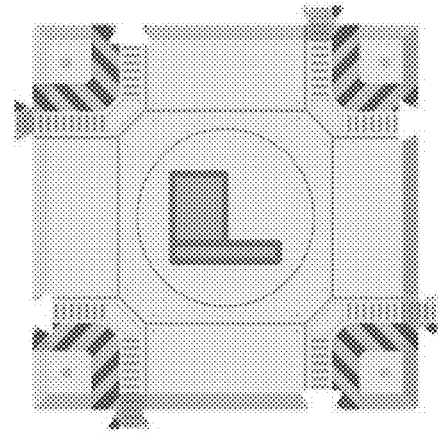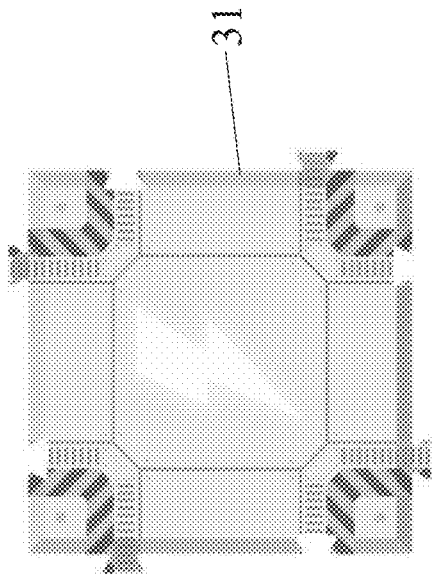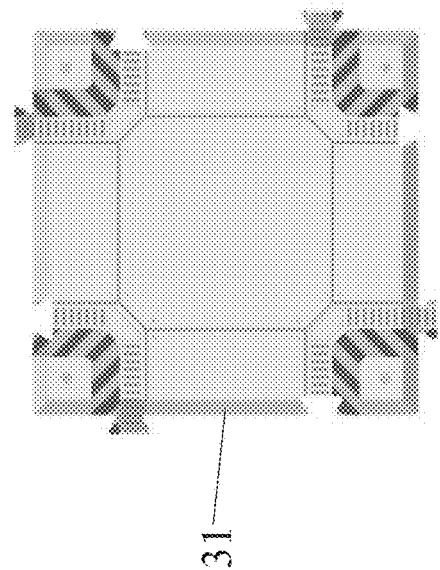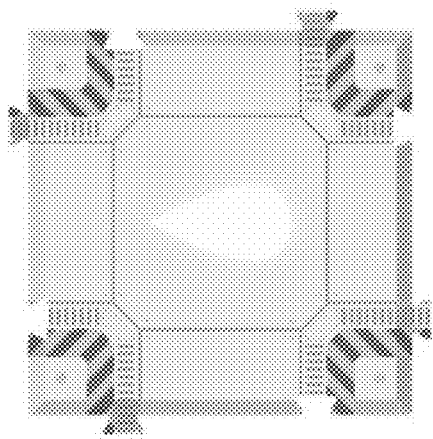
FIG. 15

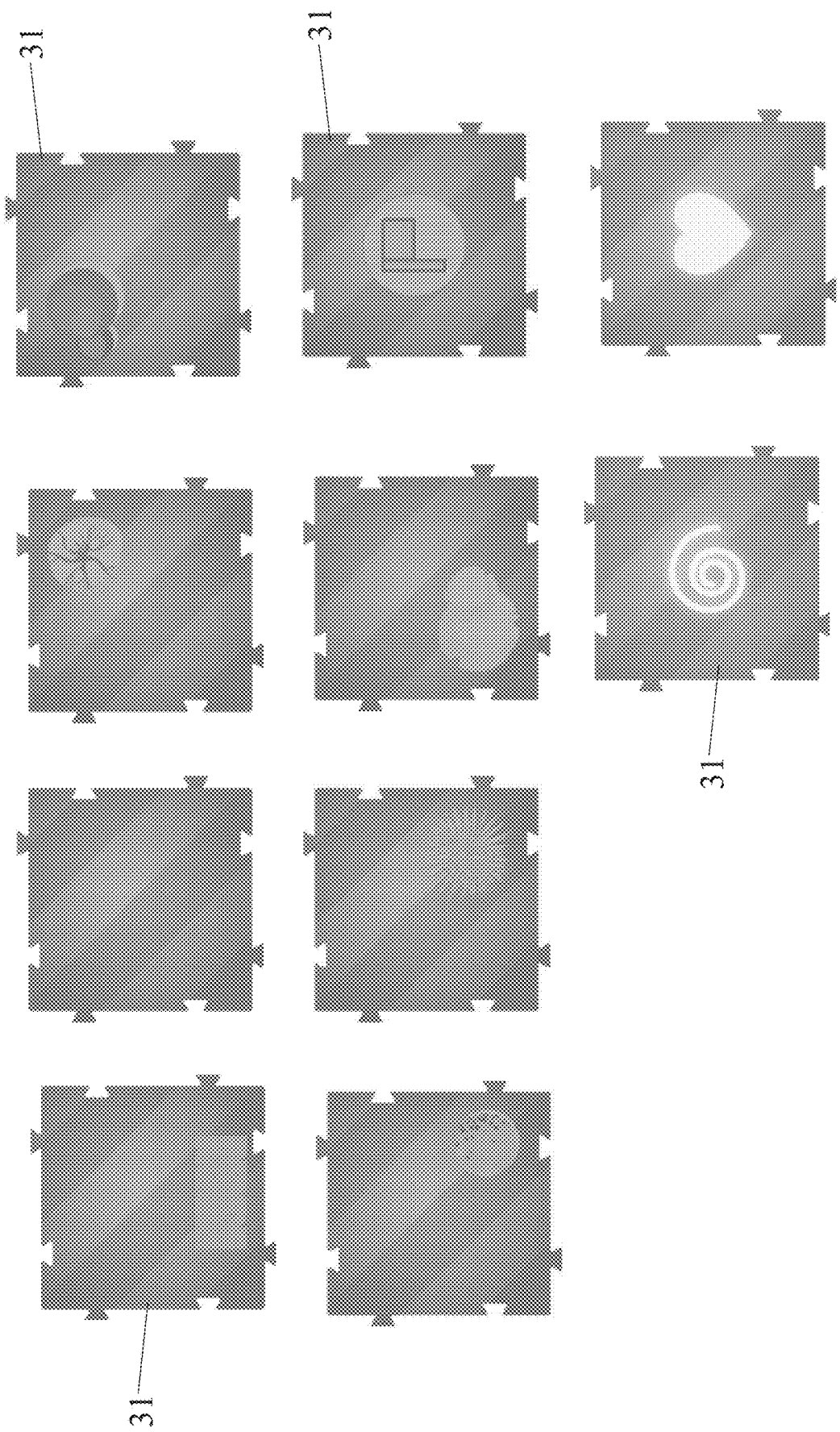

SYSTEM FOR EDUCATIONAL COMPUTER PROGRAMMING

CROSS-REFERENCE TO RELATED APPLICATION

This application claims priority of Taiwanese Invention Patent Application No. 107102688, filed on Jan. 25, 2018.

FIELD

The disclosure relates to a teaching aid, and more particularly to a system for educational computer programming.

BACKGROUND

Referring to FIG. 1, a conventional system 1 for educational computer programming according to Chinese Patent Publication No. 101020122 is illustrated. The conventional system 1 includes a mobile unit 11 and a track board 12. The mobile unit 11 includes a reader 111. The track board 12 includes a plurality of codes 121 the arrangement of which is changeable on the track board 12. By utilizing the reader 111 to read the arranged codes 121 in sequence when moving on the track board 12, the mobile unit 11 responds according to the codes 121 thus read with light or sounds. However, for the conventional system 1, motion of the mobile unit 11 is constrained when the mobile unit 11 is moving along a track on the track board 12.

Referring to FIG. 2, another conventional system 2 for educational computer programming is illustrated. Said another conventional system 2 includes a robot 21 (called "Kubo") and a plurality of road pieces 22. Each of the road pieces 22 is rectangular in shape with four sides, and one of the four sides of one of the road pieces 22 is to be connected with an arbitrary one of the four sides of another one of the road pieces 22. In addition, each of the road pieces 22 is assigned with an instruction. When moving on one of the road pieces 22, the robot 21 obtains the instruction by means of radio frequency identification (RFID) technology, and responds with an action, such as generating sounds or light, or changing the speed or the direction of movement, corresponding to the instruction. However, since an RFID reader and multiple RFID transmitters are required to implement instruction receiving and giving, these addition electronic components incur additional hardware cost.

SUMMARY

Therefore, an object of the disclosure is to provide a system for educational computer programming that can alleviate at least one of the drawbacks of the prior art.

According to the disclosure, the system includes a mobile unit, a road piece assembly, a procedure piece assembly and a controller. The road piece assembly includes a plurality of road pieces which are to be arranged to form a road for the mobile unit to move on.

Each of the road pieces is provided thereon with an identification pattern that is so laid out such that when any part of the identification pattern is scanned, an identification code associated with a position of the part of the identification pattern on the road piece will be provided. The procedure piece assembly includes a plurality of procedure pieces which are to be arranged to allow the mobile unit to move along the procedure pieces thus arranged. Each of the procedure pieces is provided with a recognition pattern that is to be scanned to provide a recognition code associated with control of the mobile unit. The controller is disposed on the mobile unit. The controller includes an optical sensor, a storage and a processor. The optical sensor is configured to scan the recognition patterns as the mobile unit moves along the procedure pieces thus arranged, so as to obtain the recognition codes, and to scan parts of the identification patterns as the mobile unit moves on the road formed by the road pieces, so as to obtain the identification codes. The storage is configured to store an instruction lookup table regarding correspondence relationships between the recognition codes and instructions for controlling actions of the mobile unit, and an identification lookup table regarding correspondence relationships between the identification codes and plural entries of coordinate information respectively indicating the positions of different parts of the identification pattern on each of the road pieces. The processor is electrically connected to the optical sensor and the storage. The processor is configured to generate a collection of the instructions based on the recognition codes thus obtained and the instruction lookup table, and to control the mobile unit to perform actions based on the collection of the instructions and the entries of the coordinate information corresponding to the identification codes thus obtained.

BRIEF DESCRIPTION OF THE DRAWINGS

Other features and advantages of the disclosure will become apparent in the following detailed description of the embodiment with reference to the accompanying drawings, of which:

FIG. 12 is a table illustrating an embodiment of a correspondence relationship between the procedure pieces and instructions of the system for educational computer programming according to the disclosure; and FIGS. 13 to 18 are schematic diagrams exemplifying top views of embodiments of the road pieces of the system for educational computer programming according to the disclosure.

DETAILED DESCRIPTION

Figure 1:
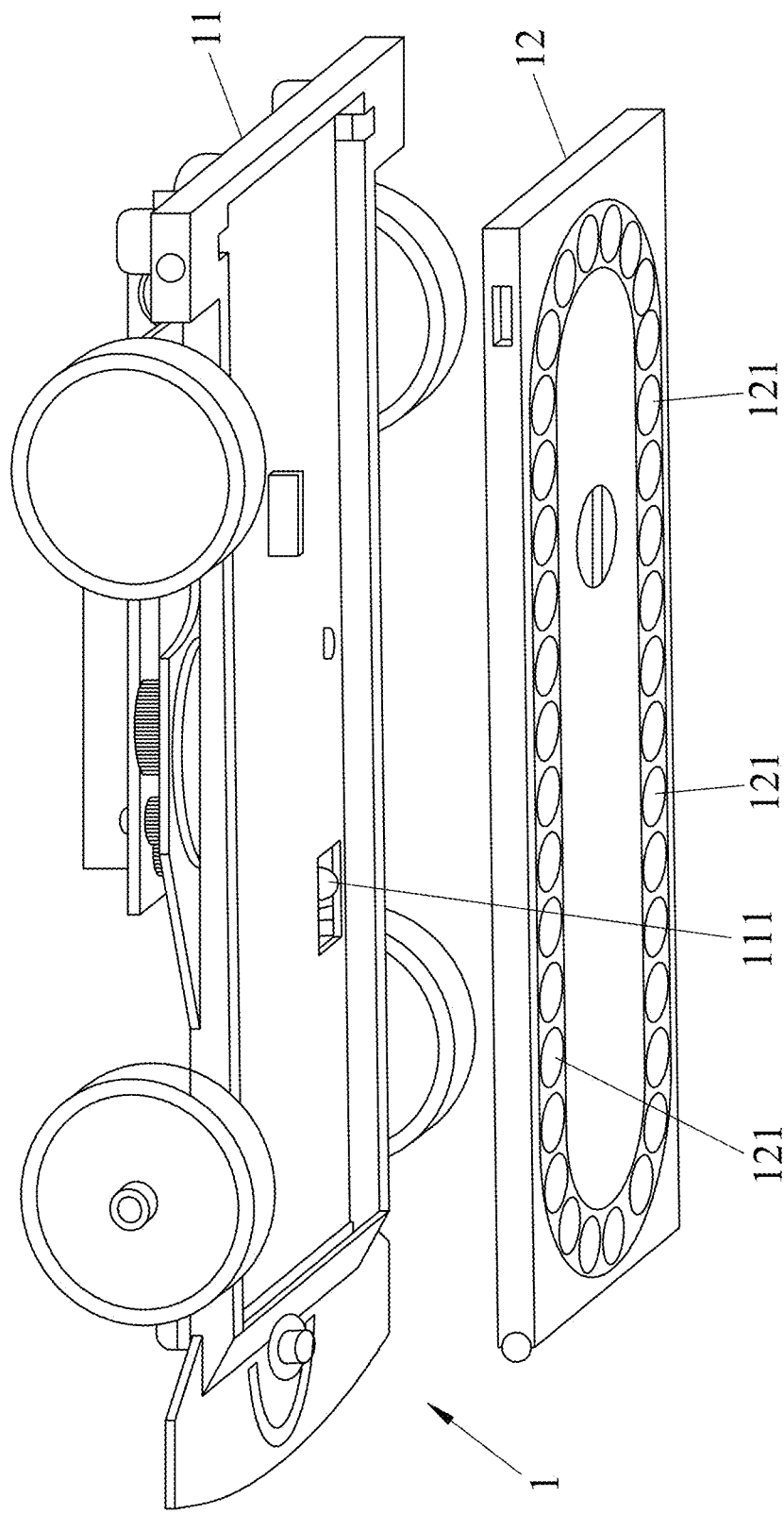
FIG. 1 is a perspective view illustrating a conventional system for educational computer programming.
Figure 2:
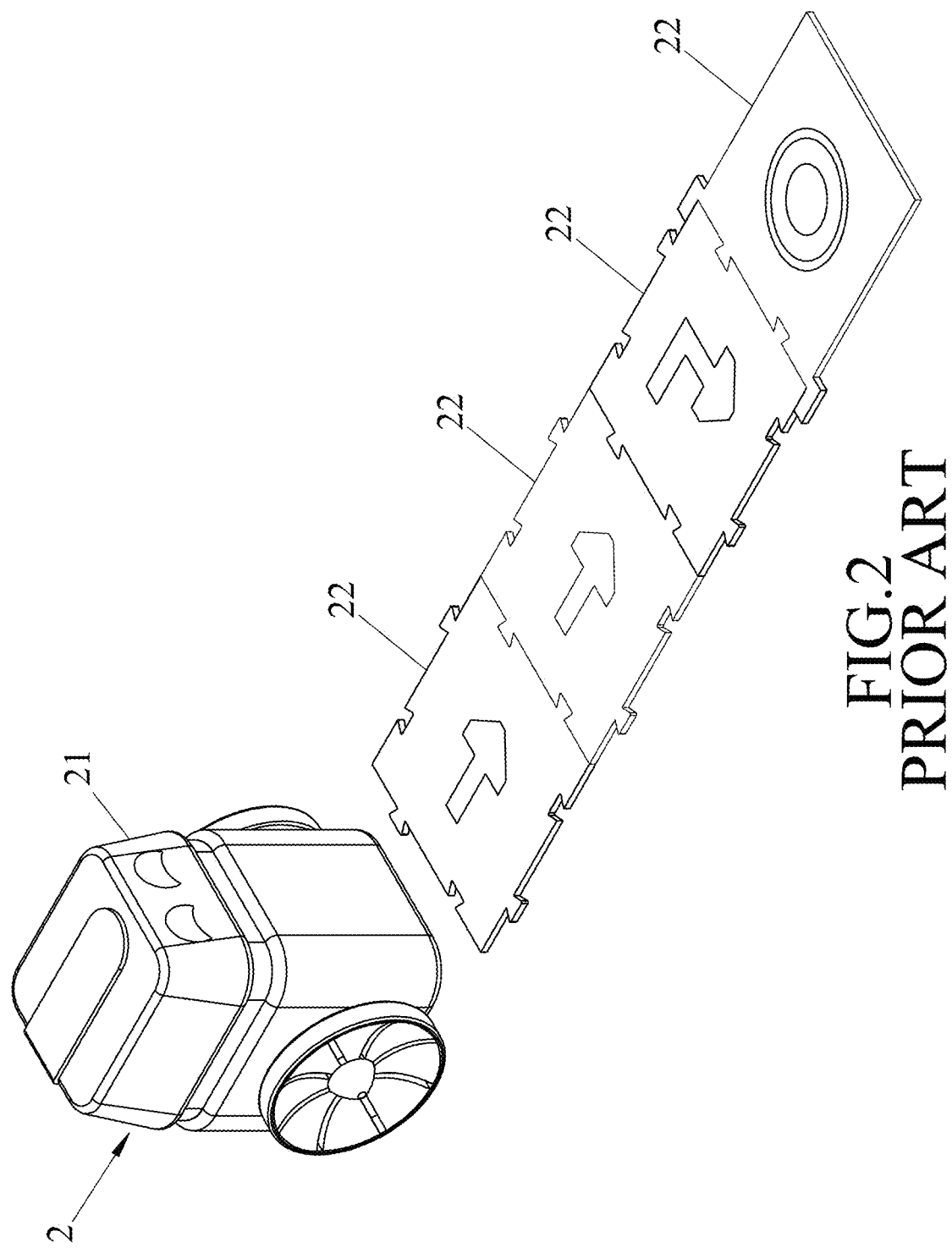
FIG. 2 is a perspective view illustrating another conventional system for educational computer programming.
Figure 3:
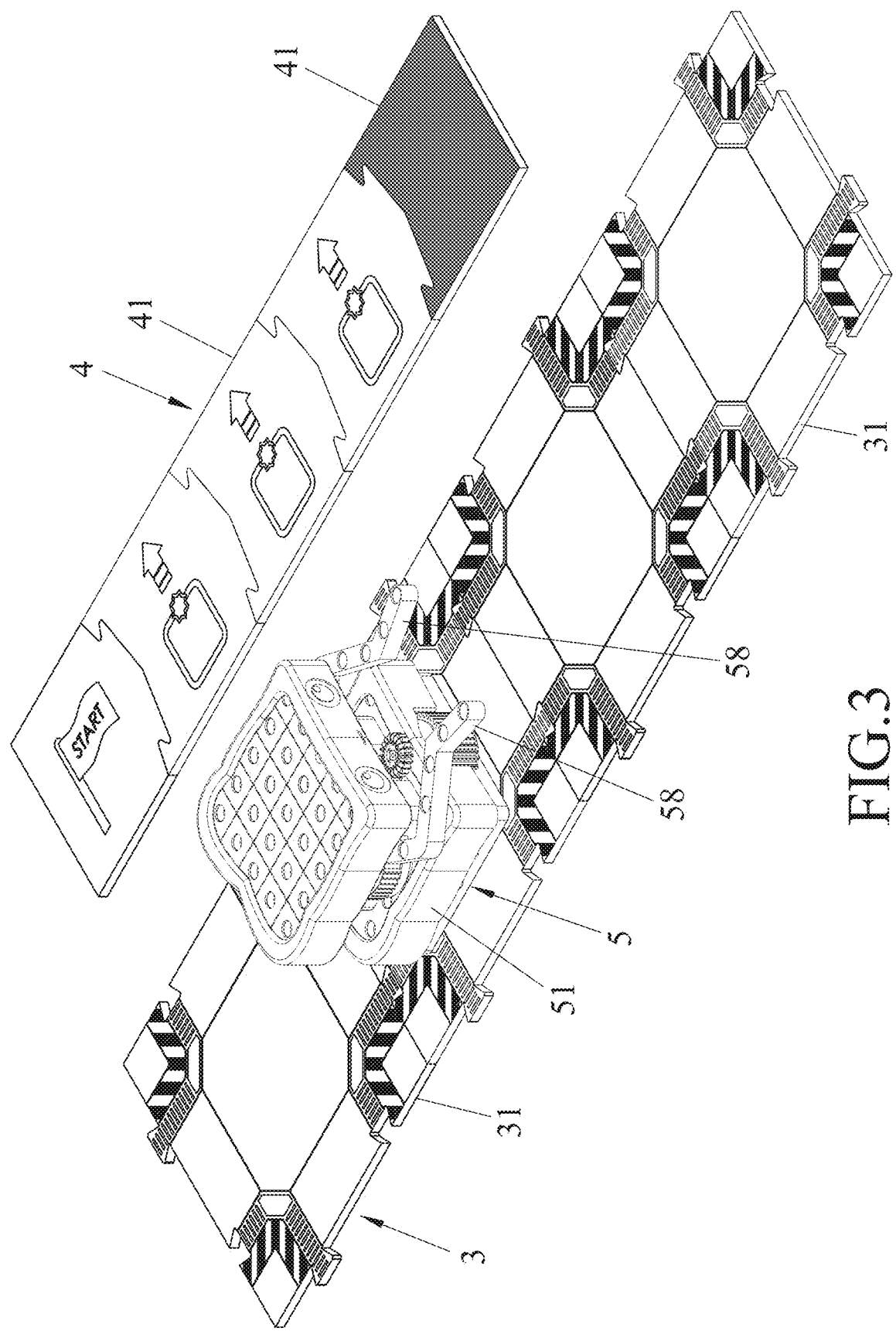
FIG. 3 is a perspective view illustrating an embodiment of a system for educational computer programming according to the disclosure.
Figure 4:
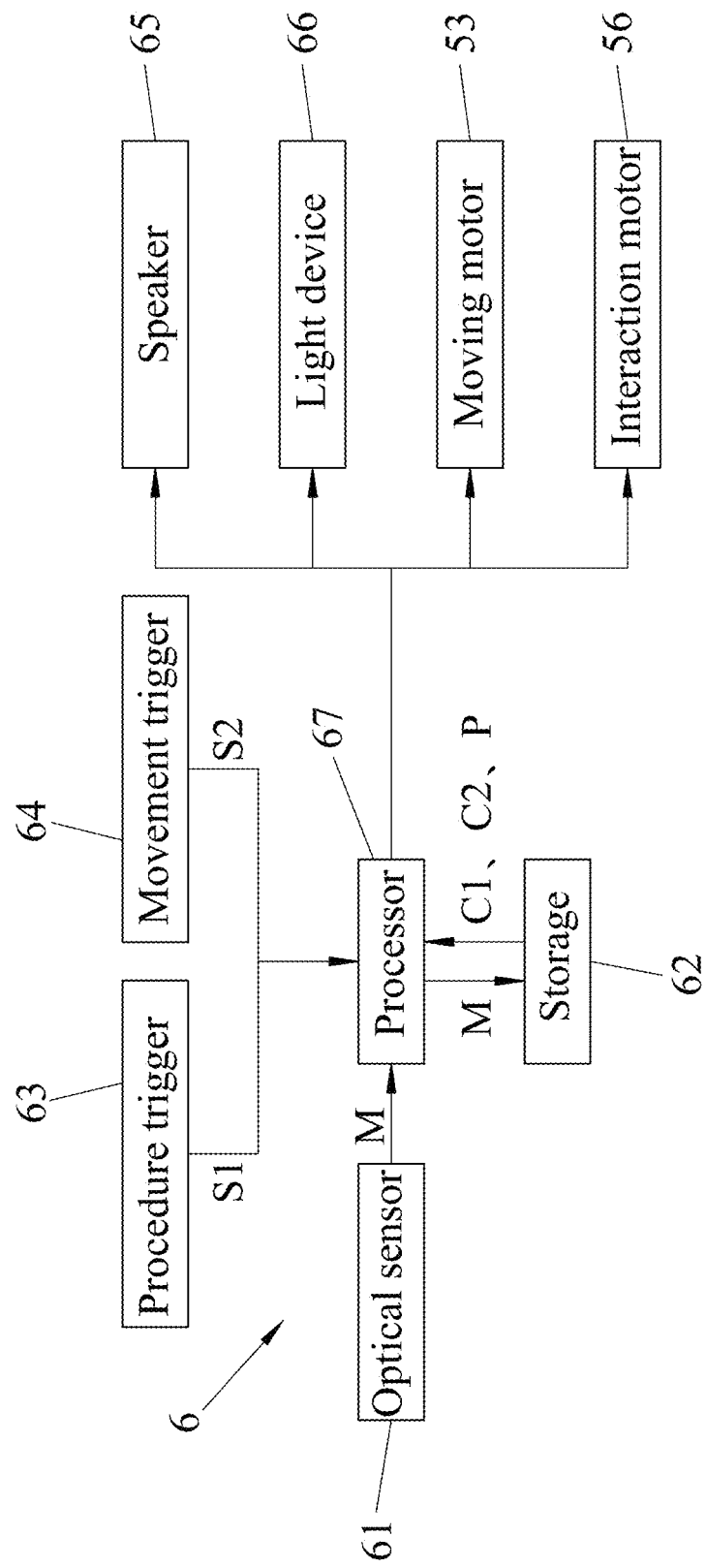
FIG. 4 is a block diagram illustrating an embodiment of a controller of the system for educational computer programming according to the disclosure.

Referring to FIGS. 3 and 4, an embodiment of a system for educational computer programming according to the disclosure is illustrated. The system includes a mobile unit 5, a road piece assembly 3, a procedure piece assembly 4 and a controller 6. The controller 6 includes an optical sensor 61, a storage 62, a procedure trigger 63, a movement trigger 64, a speaker 65, a light device 66 and a processor 67. The processor 67 of the controller 6 is electrically connected to the optical sensor 61, the storage 62, the procedure trigger 63, the movement trigger 64, the speaker 65 and the light device 66.

Figure 5:
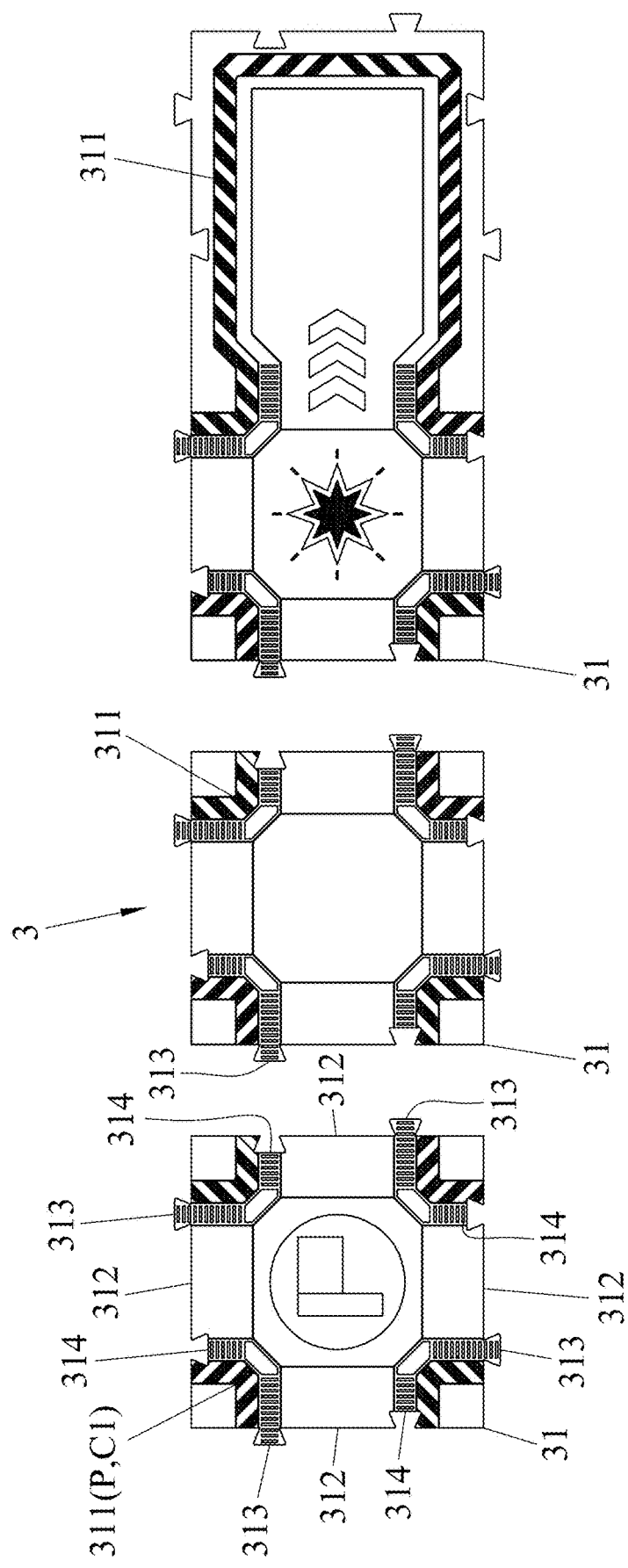
FIG. 5 is a schematic diagram illustrating a top view of an embodiment of road pieces of the system for educational computer programming according to the disclosure.

Referring to FIG. 5, the road piece assembly 3 includes a plurality of road pieces 31 which are to be arranged to form a road for the mobile unit 5 to move on. Each of the road pieces 31 is provided thereon with an identification pattern that is so laid out such that when any part of the identification pattern is scanned, an identification code associated with a position of the part of the identification pattern on the road piece 31 will be provided. It should be noted that the identification code of a part of the identification pattern of one of the road pieces 31 is further associated with performance of an event by the mobile unit 5.

Figure 9:
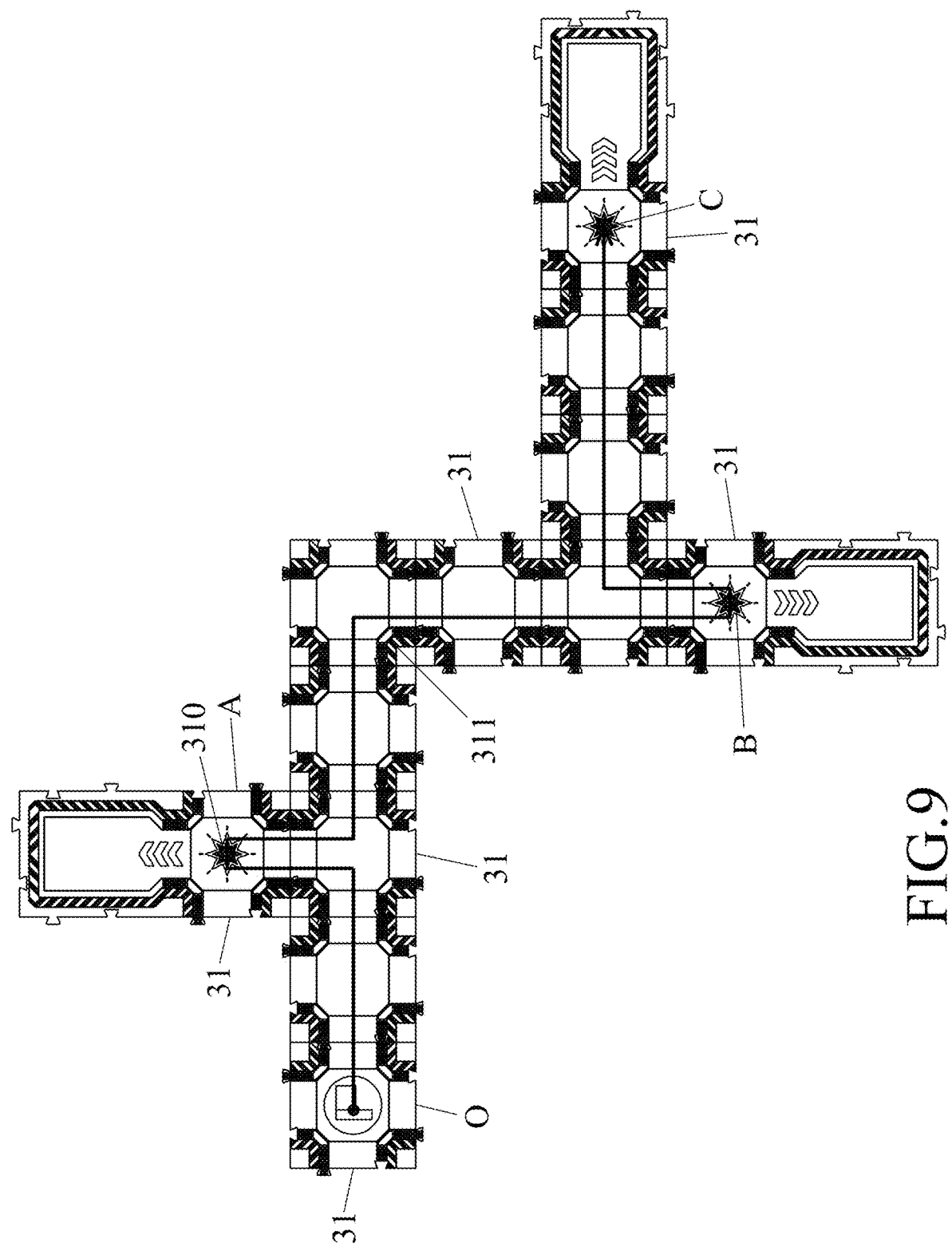
FIG. 9 is a schematic diagram exemplifying a top view of an embodiment of an arrangement of the road pieces of the system for educational computer programming according to the disclosure.

Additionally, each of the road pieces 31 is further provided thereon with a road illustration 311 for cosmetic purposes and for user's recognition that an event would occur on the road piece 31 (see a star-shaped mark 310 in FIG. 9). The road illustration 311 only interferes minimally with the identification pattern; in other words, scanning of any part of the identification pattern to determine the corresponding identification code is generally un-interfered by the presence of the road illustration 311.

Each of the road pieces 31 is rectangular in shape with four sides 312. Moreover, each of the road pieces 31 is formed with four engaging convex portions 313 respectively on the four sides 312, and is formed with four engaging concave portions 314 that correspond in shape to the four engaging convex portions 313, and that are respectively disposed on the four sides 312. Note that there may be more than four engaging concave or convex portions 314 in some of the road pieces 31. Each of the road pieces 31 is configured to be connected with another one of the road pieces 31 by the engaging convex portion 313 and the engaging concave portion 314 on one of the four sides 312 of the road piece 31 respectively engaging the engaging concave portion 314 and the engaging convex portion 313 on an arbitrary one of the four sides 312 of said another road piece 31.

The identification pattern includes a plurality of coordinate dots which are barely visible with the naked eye, which are printed in rows and columns on the road piece 31, and which are to be scanned by the optical sensor 61 so as to obtain plural entries of coordinate information (P). Any part of the identification pattern scannable by the optical sensor 61 may have at least one of the coordinate dots. For example, nine coordinate dots may constitute a part of the identification pattern scannable by the optical sensor 61. In this embodiment, each of the entries of the coordinate information (P) is formatted as coordinates of said at least one of the coordinate dots forming a corresponding part of the identification pattern on one of the road pieces 31 in a Cartesian coordinate system. In this embodiment, the identification pattern is to be scanned by means of optical identification (OID), and is printed as an optical identifiable pattern of dots. However, implementation of the identification pattern is not limited to the disclosure herein. Since implementation of OID is well known to one skilled in the relevant art, detailed explanation of the same is omitted herein for the sake of brevity.

Figure 6:
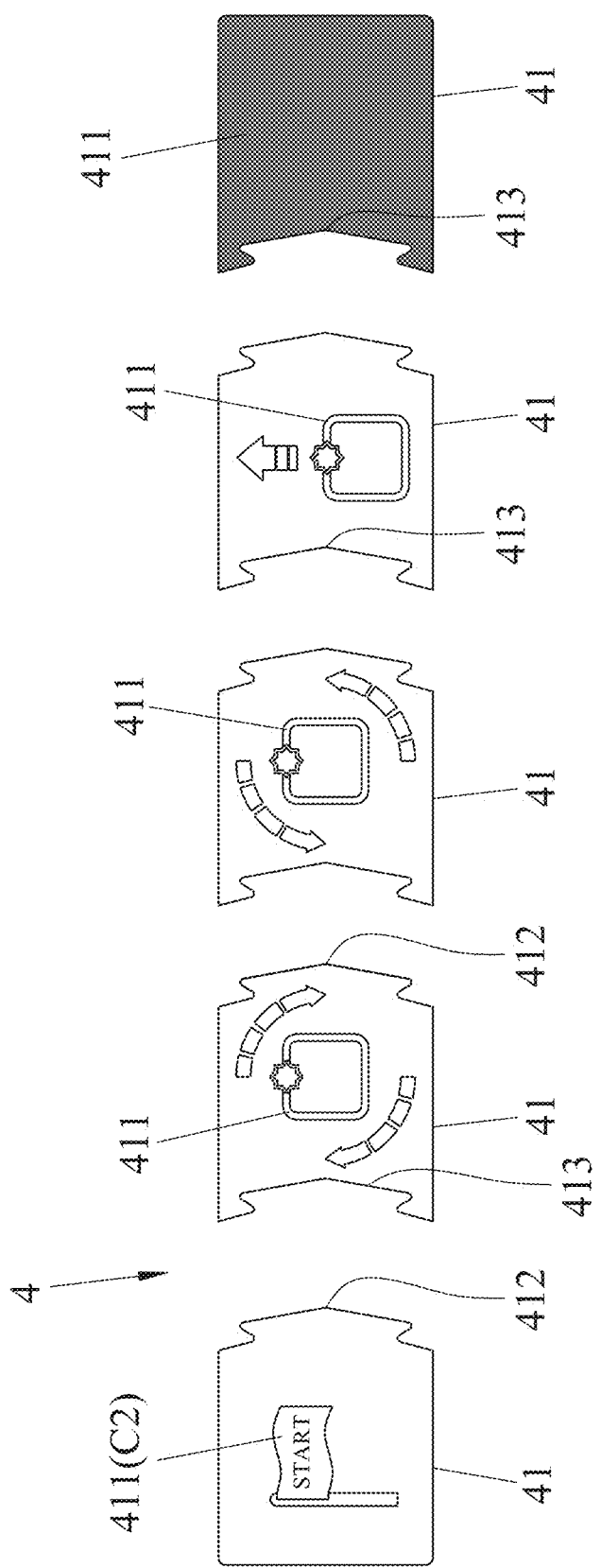
FIG. 6 is a schematic diagram illustrating a top view of an embodiment of procedure pieces of the system for educational computer programming according to the disclosure.
Figure 7:
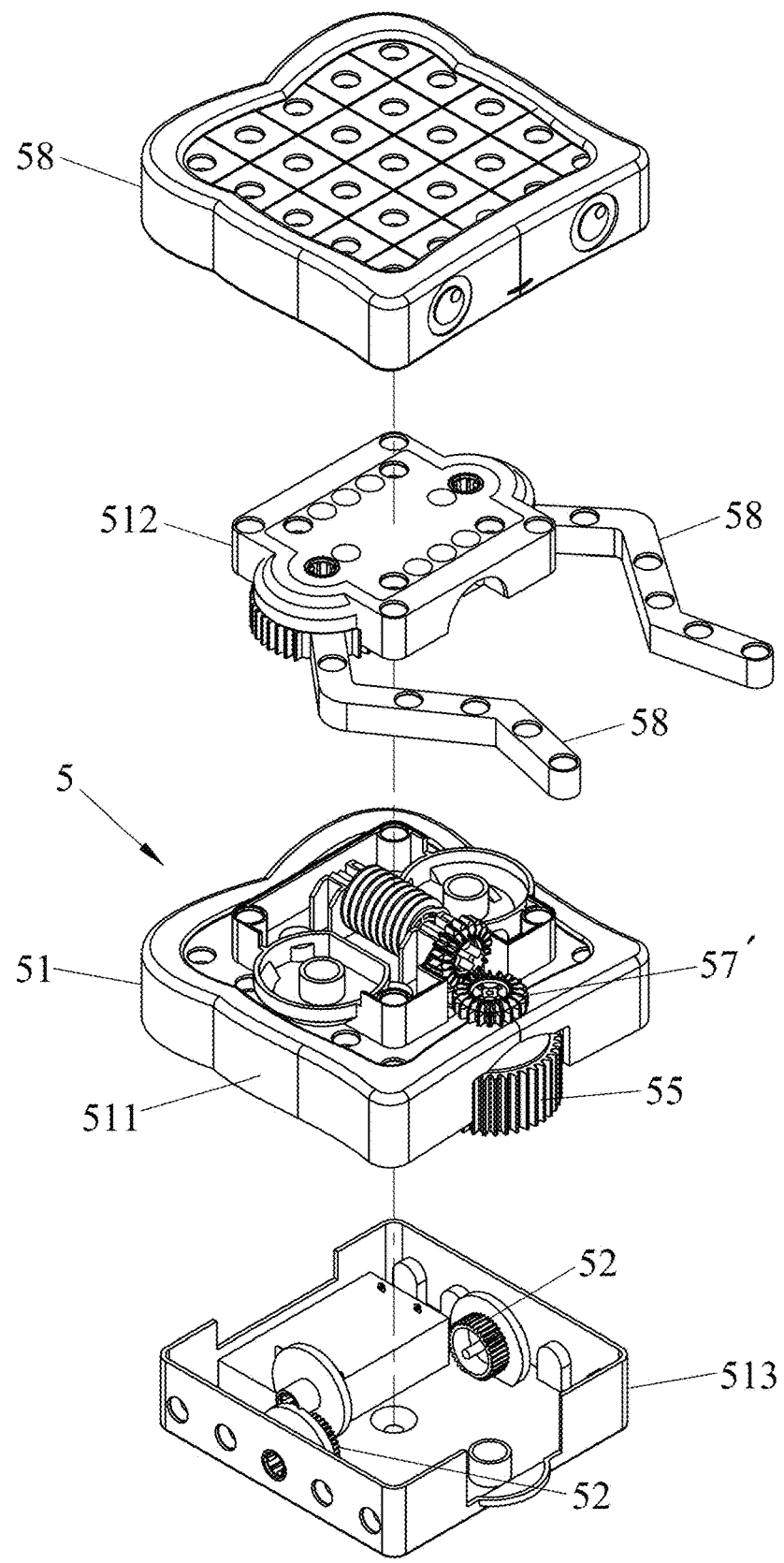
FIG. 7 is an exploded perspective view illustrating an embodiment of a mobile unit of the system for educational computer programming according to the disclosure when viewed from above.
Figure 8:
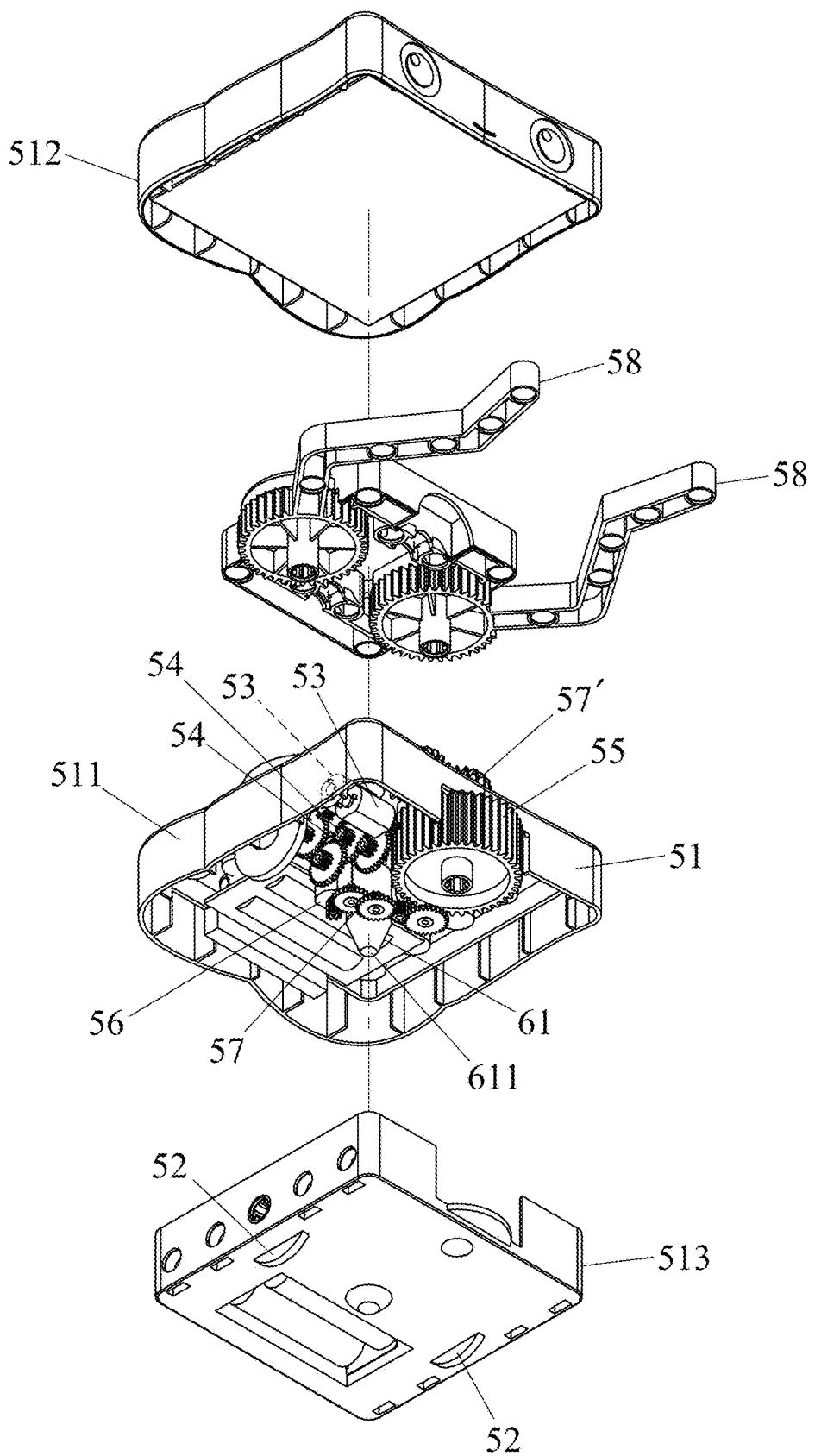
FIG. 8 is an exploded perspective view illustrating the embodiment of the mobile unit of the system for educational computer programming according to the disclosure when viewed from below.

Referring to FIG. 6, the procedure piece assembly 4 includes a plurality of procedure pieces 41 which are to be arranged to allow the mobile unit 5 to move along the procedure pieces 41 thus arranged. In this embodiment, the procedure pieces 41 are linearly arranged, but implementation thereof is not limited to the disclosure herein. Each of the procedure pieces 41 is provided thereon with a recognition pattern that is to be scanned to provide a recognition code associated with control of the mobile unit 5. Similar to the identification pattern, the recognition pattern is to be scanned by means of OID, and is printed as an optical identifiable pattern of dots. In addition, each of the procedure pieces 41 is further provided thereon with a procedure illustration 411 for user's recognition of what instruction will be given for control of the mobile unit 5. The procedure illustration 411 only interferes minimally with the recognition pattern; in other words, scanning of the recognition pattern to determine the corresponding recognition code is generally un-interfered by the presence of the procedure illustration 411.

Each of the procedure pieces 41, other than the two that are designated to terminate any arrangement of the procedure pieces 41, is formed with a protrusion 412 and a receptacle 413 at opposite sides of the procedure piece 41. Consecutive two of the procedure pieces 41 are connected with each other via their respective protrusion 412 and receptacle 413.

Referring to FIGS. 3, 4, 7 and 8, the mobile unit 5 includes a main body 51, two moving wheels 52, two moving motors 53, two moving gear sets 54, at least one interaction gear 55, at least one interaction motor 56, a transmission gear set 57 and at least one accessory 58. The moving wheels 52 are rotatably installed on the main body 51. The moving motors 53 are disposed on the main body 51 and a reconfigured to generate driving power. The moving gear sets 54 are configured to transmit the driving power generated by the moving motors 53 respectively to the moving wheels 52. Said at least one interaction gear 55 is rotatably installed on the main body 51. Said at least one interaction motor 56 is disposed on the main body 51 and is configured to generate driving power. The transmission gear set 57 is configured to transmit the driving power generated by said at least one interaction motor 56 to said at least one interaction gear 55. Said at least one accessory 58 is separably coupled to the main body 51 and is to be driven by said at least one interaction motor 56 via another transmission gear set 57' and said at least one interaction gear 55. Specifically speaking, the main body 51 includes a middle portion 511, an upper portion 512 and a bottom portion 513. The upper portion 512 and the bottom portion 513 are coupled to opposite sides of the middle portion 511. Said at least one accessory 58 may be implemented to include a gear building block, a cubic building block or a decorative building block, but implementation thereof is not limited to the disclosure herein and may vary in other embodiments. In this embodiment, said at least one accessory 58 is implemented to be two arms. In this embodiment, the mobile unit 5 is implemented to be formed as a robot in appearance, but implementation of the mobile unit 5 is not limited to the disclosure herein and may vary in other embodiments.

The controller 6 is disposed on the main body 51 of the mobile unit 5. The optical sensor 61 of the controller 6 includes an optical pick-up 611 that extends downwardly through the bottom portion 513 of the main body 51 when the mobile unit 5 is assembled and in operation. By the optical pick-up 611, the optical sensor 61 is configured to scan the recognition patterns when the mobile unit 5 is moving along the procedure pieces 41 thus arranged, so as to obtain the recognition codes, and to scan parts of the identification patterns as the mobile unit 5 moves on the road formed by the road pieces 31, so as to obtain the identification codes.

The storage 62 of the controller 6 is configured to store a command lookup table regarding correspondence relationships between the identification codes and commands (C1) for controlling the mobile unit 5 to perform the events, an instruction lookup table regarding correspondence relationships between the recognition codes and instructions (C2) for controlling actions of the mobile unit 5, and an identification lookup table regarding correspondence relationships between the identification codes and plural entries of coordinate information (P) respectively indicating the positions of different parts of the identification pattern on each of the road pieces 31.

In this embodiment, the storage 62 may be implemented by a flash memory, an electrically-erasable programmable read-only memory (EEPROM) or any other non-volatile memory devices, but is not limited thereto and may vary in other embodiments.

The procedure trigger 63 of the controller 6 is disposed on the mobile unit 5. The procedure trigger 63 is electrically connected to the processor 67, and is configured to be operated to output a procedure trigger signal (S1).

The movement trigger 64 of the controller 6 is disposed on the mobile unit 5, and is electrically connected to the processor 67. The movement trigger 64 is configured to be operated to output a movement trigger signal (S2). The procedure trigger 63 and the movement trigger 64 may be implemented to be push buttons for user operation.

The speaker 65 of the controller 6 is configured to generate sound.

The light device 66 of the controller 6 is configured to generate light. For example, the light device 66 includes one or more light emitting diodes (LEDs).

In this embodiment, the processor 67 may be implemented to be a central processing unit (CPU), a microprocessor, or any circuit configurable/programmable in a software manner and/or hardware manner to implement functionalities of this disclosure, but implementation of the processor 67 is not limited to the disclosure herein and may vary in other embodiments.

The processor 67 is configured to generate a collection of the instructions (C2) based on the recognition codes thus obtained and the instruction lookup table, and to control the mobile unit 5 to perform actions based on the collection of the instructions (C2) and the entries of the coordinate information (P) corresponding to the identification codes thus obtained.

Specifically speaking, the processor 67 is configured to switch between performing a first built-in procedure and performing a second built-in procedure, in response to receipt of the procedure trigger signal (S1) outputted by the procedure trigger 63. The first built-in procedure is to be executed by the processor 67 to control the mobile unit 5 to move along a straight line, so as to move along the procedure pieces 41 thus linearly arranged, to scan the recognition patterns on the procedure pieces 41 to obtain the recognition codes, to determine the collection of the instructions (C2) corresponding respectively to the recognition codes thus obtained, and to generate a computer program based on the collection of the instructions (C2). The second built-in procedure is executed to control the mobile unit 5 to discard the computer program thus generated.

The processor 67 is configured to execute, in response to receipt of the movement trigger signal (S2) outputted by the movement trigger 64, the computer program that is generated based on the collection of the instructions (C2) corresponding to the recognition codes thus obtained, so as to control the mobile unit 5 to move on the road formed by the road pieces 31.

Referring to FIGS. 4, 9, 10 and 12, an example of operating the embodiment of the system for educational computer programming according to the disclosure is described as follows. As shown in FIG. 9, in order to control the mobile unit 5 (see FIG. 3) to move from one of the road pieces 31 that is indicated by a letter "O", sequentially through the road pieces 31 that are indicated by letters "A" and "B", and eventually arrive at one of the road pieces 31 that is indicated by a letter "C", the computer program for accomplishing the above-mentioned task is generated according to an arrangement of the procedure pieces 41 shown in FIG. 10, where the procedure pieces 41 required to be sequentially scanned are respectively indicated by the procedure illustrations 411 to correspond to the following instructions (C2): to start a flow of collecting the instructions (C2) for generation of the computer program, to step one piece forward, to step one piece forward, to rotate 90 degrees counterclockwise, to step one piece forward, to pause for one second, to rotate 90 degrees clockwise, to rotate 90 degrees clockwise, to step one piece forward, to rotate 90 degrees counterclockwise, to step one piece forward, to step one piece forward, to rotate 90 degrees clockwise, to step one piece forward, to step one piece forward, to step one piece forward, to rotate the interaction gear 55 counterclockwise for three seconds, to rotate 90 degrees counterclockwise, to rotate 90 degrees counterclockwise, to step one piece forward, to rotate 90 degrees clockwise, to step one piece forward, to step one piece forward, to step one piece forward, to rotate the interaction gear 55 clockwise for three seconds, and finally to terminate the flow of collecting the instructions (C2) for generation of the computer program.

Figure 10:
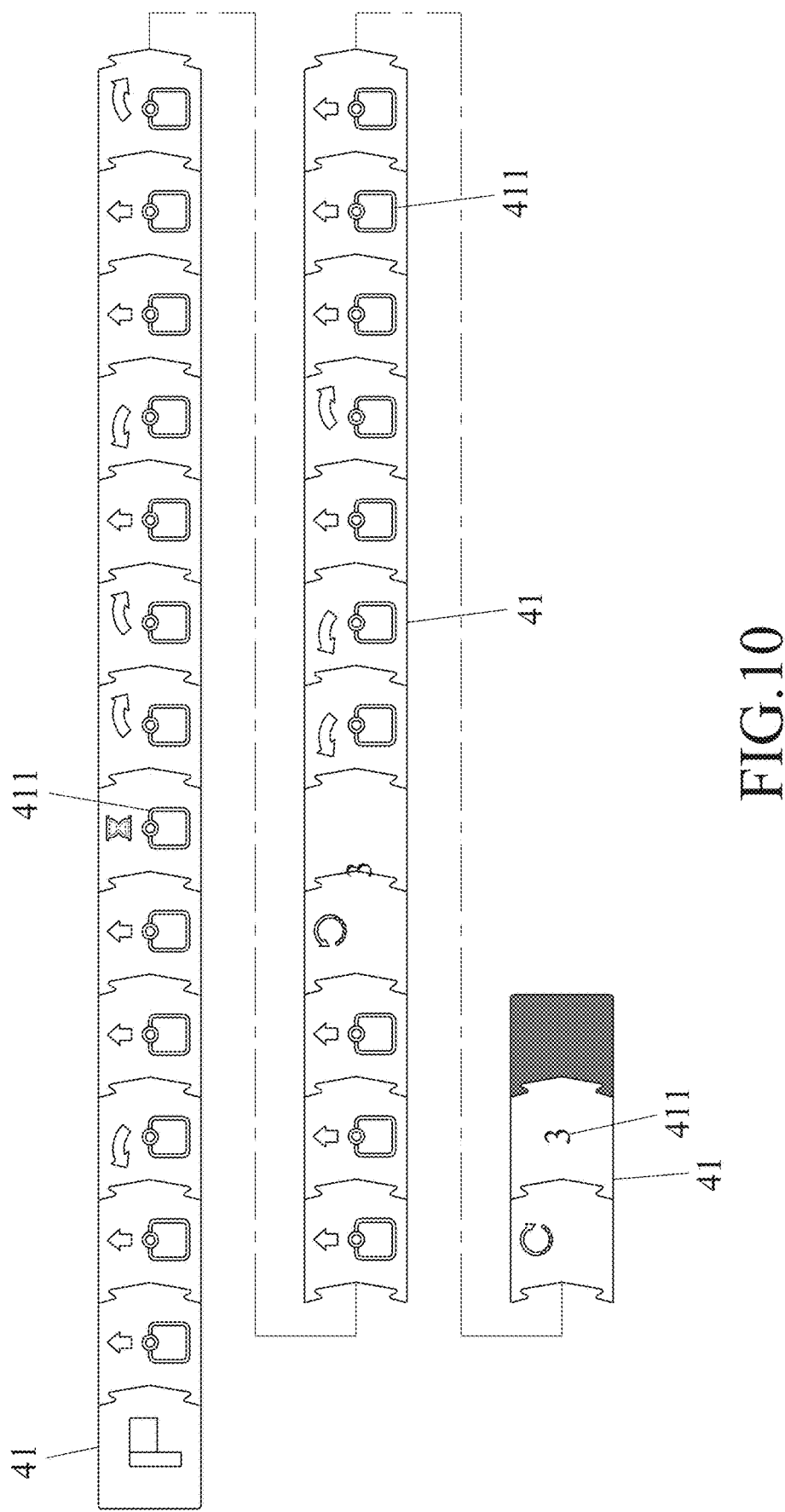
FIG. 10 is a schematic diagram exemplifying a top view of an embodiment of an arrangement of the procedure pieces of the system for educational computer programming according to the disclosure.

The mobile unit 5 is to be put on the first one in the arrangement of the procedure pieces 41 shown in FIG. 10, and is controlled by the processor 67 executing the first built-in procedure to move along the arrangement of the procedure pieces 41 after the processor 67 receives the procedure trigger signal (S1) outputted by the procedure trigger 63. Specifically, for the first built-in procedure, the processor 67 controls the moving motors 53 to drive, via the moving gear sets 54, the moving wheels 52 to rotate so that the mobile unit 5 moves in a straight line along the arrangement of the procedure pieces 41. At the same time, when the mobile unit 5 moves linearly along the arrangement of the procedure pieces 41 as shown in FIG. 10, the processor 67 obtains the recognition codes by scanning, via the optical sensor 61, the recognition patterns on the procedure pieces 41, determines the collection of the instructions (C2) corresponding respectively to the recognition codes thus obtained, and generates the computer program for later control of the mobile unit 5 to perform planned actions, such as to move along a planned route as shown in FIG. 9, based on the computer program thus generated. Upon obtaining, through the scanning of the recognition pattern on the last one of the arrangement of the procedure pieces 41 by the optical sensor 61, one of the recognition codes that indicates the end of collecting instructions for generation of the computer program, the processor 67 controls the moving motors 53 to stop driving the moving wheels 52.

Thereafter, the mobile unit 5 is put on the one of the road pieces 31 of the road indicated by the letter "O" as shown in FIG. 9, and is controlled by the processor 67 executing the computer program to perform the planned actions on the road as shown in FIG. 9 after the processor 67 receives the movement trigger signal (S2) outputted by the movement trigger 64.

Specifically speaking, the processor 67 executes the computer program to control the moving motors 53 to drive, via the moving gear sets 54, the moving wheels 52 to rotate, and to control the interaction motor 56 to drive, via the transmission gear set 57, the interaction gear 55 to rotate, so that the mobile unit 5 performs the planned actions, such as cruising on the road illustrated in FIG. 9 and described as follows: moving forward a distance of two road pieces, rotating 90 degrees counterclockwise by controlling one of the moving wheels 52 at the right side of the mobile unit 5 to rotate forward and by controlling the other one of the moving wheels 52 at the left side of the mobile unit 5 to rotate backward, moving forward a distance of one road piece to arrive at the one of the road pieces 31 that is indicated by the letter "A", pausing thereon for one second, rotating 180 degrees clockwise by controlling the one of the moving wheels 52 at the left side of the mobile unit 5 to rotate forward and by controlling the other one of the moving wheels 52 at the right side of the mobile unit 5 to rotate backward, moving forward the distance of one road piece, rotating 90 degrees counterclockwise, moving forward the distance of two road pieces, rotating 90 degrees clockwise, moving forward a distance of three road pieces to arrive at the one of the road pieces 31 that is indicated by the letter "B", rotating the interaction gear 55 counterclockwise for three seconds, rotating 180 degrees counterclockwise, moving forward the distance of one road piece, rotating 90 degrees clockwise, moving forward the distance of three road pieces to arrive at the one of the road pieces 31 that is indicated by the letter "C", rotating the interaction gear 55 clockwise for three seconds, and finally stopping the flow of the computer program.

It is worth noting that by scanning different parts of the identification patterns via the optical scanner 61 to obtain the identification codes as the mobile unit 5 is moving on the road pieces 31, and by determining, based on the identification codes thus obtained, the plural entries of coordinate information (P) which respectively indicate the positions of the scanned parts of the identification patterns on the road pieces 31, the processor 67 is capable of determining, at any time during movement on the road pieces 31, the position of the mobile unit 5 relative to the road formed by the road pieces 31 and preventing the mobile unit 5 from deviating from the road.

Figure 11:
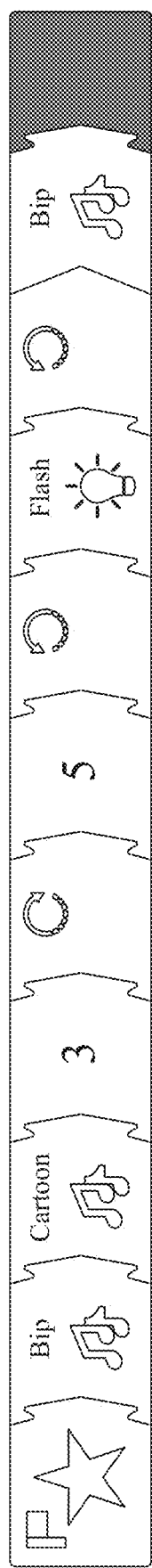
FIG. 11 is a schematic diagram exemplifying a top view of an embodiment of another arrangement of the procedure pieces of the system for educational computer programming according to the disclosure.
Figure 14:
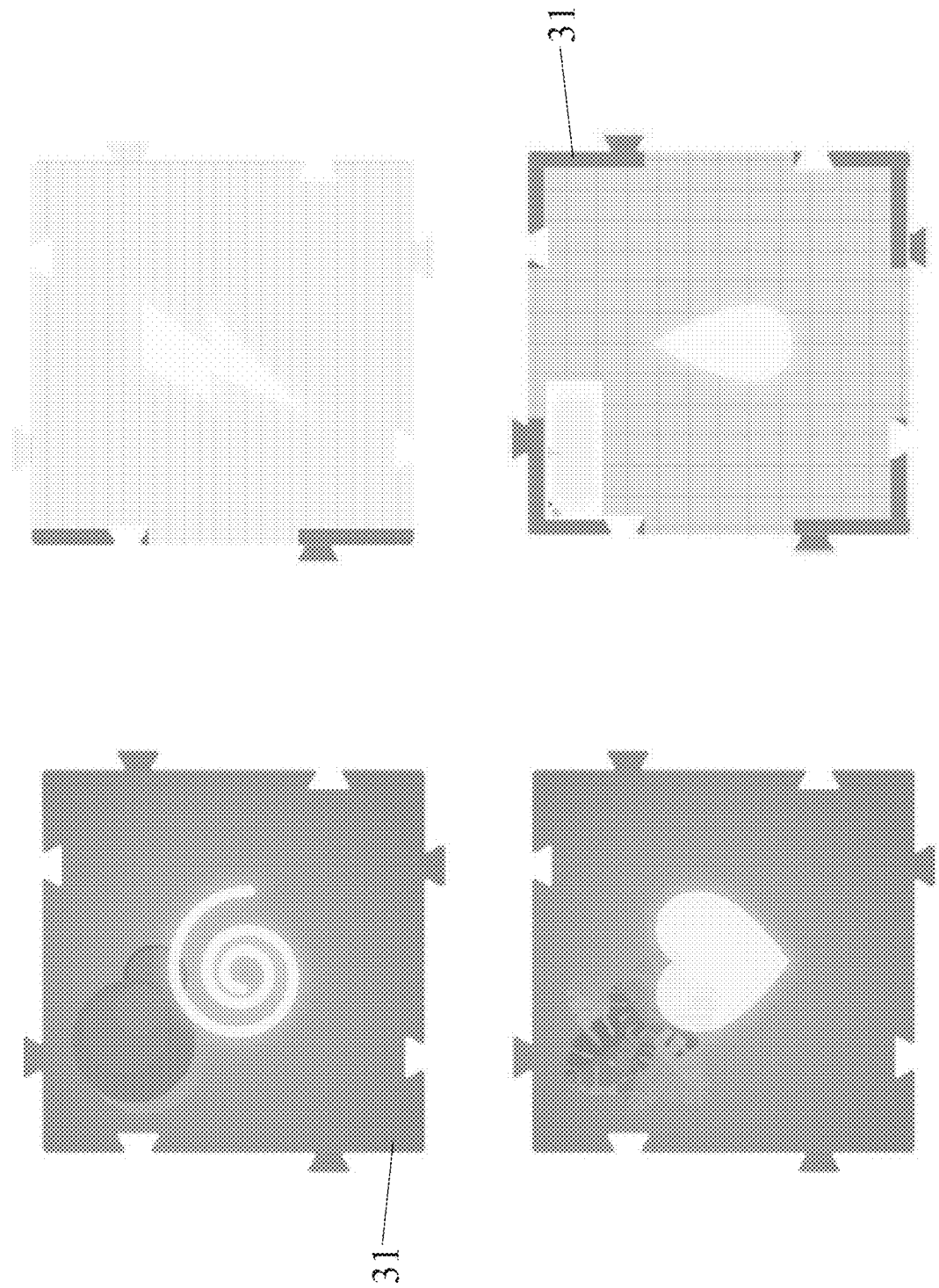
Figure 16:
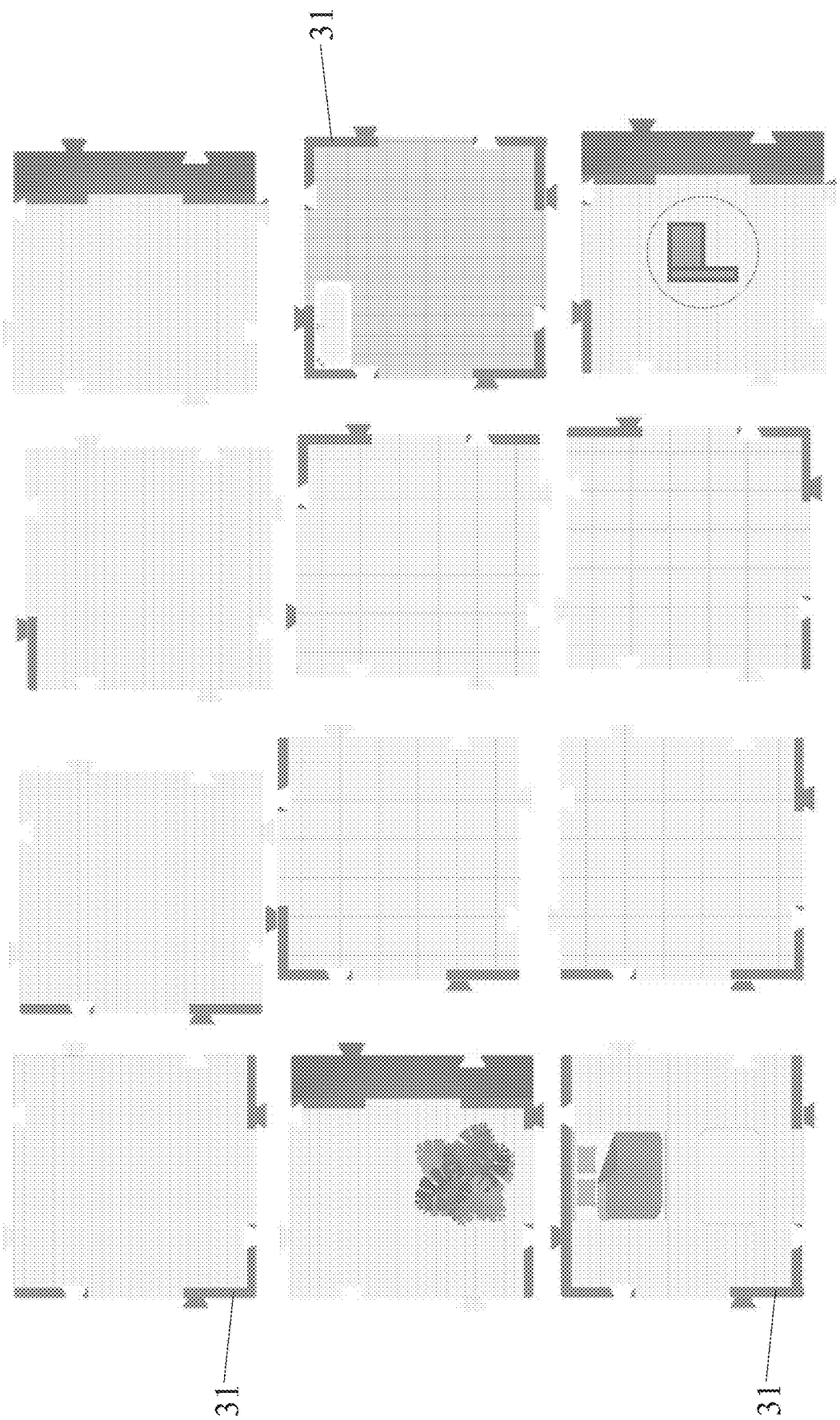
Figure 17:
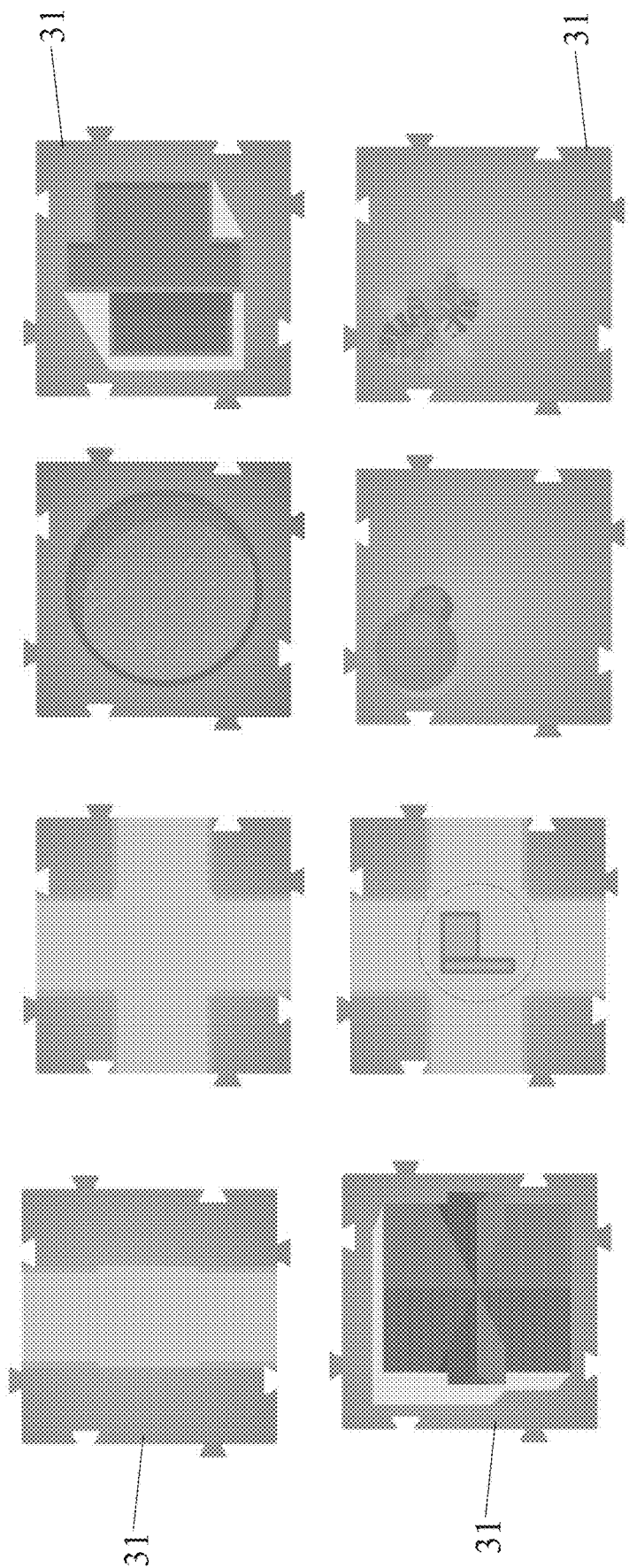

Referring to FIGS. 9 and 11, an example of performing the command (C1) during execution of the computer program for controlling the mobile unit 5 to perform the corresponding event is described in the following. The storage 62 is further configured to store a set of instructions which is generated according to the instruction lookup table and the recognition codes obtained by scanning the recognition patterns on another arrangement of the procedure pieces 41. The set of instructions corresponds to one of the commands (C1) for controlling the mobile unit 5 to perform one of the events. As the mobile unit 5 moves on a certain one of the road pieces 31 including the identification pattern a part of which contains the identification code associated with the command (C), the processor 67 is configured to control the mobile unit 5 to perform the event based on the command (C1) that corresponds to the set of instructions that is stored in advance. In order to control the mobile unit 5 to perform the event (e.g., to generate light, to generate sounds, or to play music) when the mobile unit 5 moves on the road piece 31 that is indicated by the road illustration 311 including the star-shaped mark 310 as shown in FIG. 9, the set of instructions corresponding to the command (C1) regarding the event is required to be established according to the recognition codes obtained by scanning, via the optical scanner 61, the recognition patterns on said another arrangement of the procedure pieces 41 such as those shown in FIG. 11. For said another arrangement of the procedure pieces 41 shown in FIG. 11, when moving to the road piece 31 depicted with the road illustration 311 that has the star-shaped mark 310, the mobile unit 5 is expected to be controlled by the processor 67, which pauses execution of the computer program and performs the set of instructions corresponding to the command (C1), to generate beep sounds and cartoon music for three seconds by the speaker 65, to rotate the interaction gear 55 clockwise for five seconds, to rotate the interaction gear 55 counterclockwise, to emit flashing light by the light device 66, to rotate the interaction gear 55 counterclockwise, and to generate beep sounds by the speaker 65 as an end of the event. Consequently, besides controlling the mobile unit 5 to move from the one of the road pieces 31 that is indicated by the letter "O", sequentially through the road pieces 31 that are indicated by letters "A" and "B", and eventually arrive at the one of the road pieces 31 that is indicated by the letter "C", the processor 67 executing the computer program is capable of controlling the mobile unit 5 to perform the event (e.g., to generate light, to generate sounds, or to play music) when the mobile unit 5 is on one of the road pieces 31 corresponding to the event.

However, implementation of the event is not limited to the disclosure herein and may vary in other embodiments. In one embodiment, the event is exemplified as an action of controlling said at least one accessory 58, which is implemented to be two arms, to clamp an object on the road. In one embodiment, the event is exemplified as an action of controlling said at least one accessory 58, which is implemented to be a bat, to hit a ball. Since implementation of the event is well known to one skilled in the relevant art, detailed explanation of the same is omitted herein for the sake of brevity.

FIGS. 13 to 18 show that the road pieces 31 may have different road illustrations depicted thereon, and may be arranged to form a variety of roads for the mobile unit 5 to move on. In addition, referring to FIGS. 3 and 12, actions of the mobile unit 5 may be controlled by the computer program that is generated based on the instructions (C2) corresponding to the different procedure pieces 41. Furthermore, the mobile unit 5 can be controlled to respond to the commands (C1) that are obtained as the mobile unit 5 moves on the road. Through the diversified scenarios that can be come up with using different combinations of the road and procedure pieces 31, 41, educational purpose can be achieved and creativity of users may be promoted.

In summary, the system for educational computer programming according to the disclosure utilizes the optical sensor 61 to scan recognition patterns on the procedure pieces 41 and identification patterns on the road pieces 31 to correspondingly obtain the recognition and identification codes, and utilizes the processor 67 to control the mobile unit 5 to perform actions based on the collection of the instructions generated according to the recognition codes and on the entries of the coordinate information obtained according to the identification codes. The system for educational computer programming enriches participation in learning, and consequently enhances the effect of education for computer programming.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A system for educational computer programming, comprising:
   a mobile unit;
   a road piece assembly including a plurality of road pieces which are to be arranged to form a road for said mobile unit to move on, and each of which is provided thereon with an identification pattern that is so laid out such that when any part of said identification pattern is scanned, an identification code associated with a position of the part of said identification pattern on said road piece will be provided;
   a procedure piece assembly including a plurality of procedure pieces which are to be arranged to allow said mobile unit to move along said procedure pieces thus arranged, each of said procedure pieces being provided thereon with a recognition pattern that is to be scanned to provide a recognition code associated with control of said mobile unit; and
   a controller disposed on said mobile unit, and including
   an optical sensor that is configured to scan said recognition patterns as said mobile unit moves along said procedure pieces thus arranged, so as to obtain the recognition codes, and to scan parts of said identification patterns as said mobile unit moves on the road formed by said road pieces, so as to obtain the identification codes,
   a storage configured to store an instruction lookup table regarding correspondence relationships between the recognition codes and instructions for controlling actions of said mobile unit, and an identification lookup table regarding correspondence relationships between the identification codes and plural entries of coordinate information respectively indicating the positions of different parts of said identification pattern on each of said road pieces, and
   a processor electrically connected to said optical sensor and said storage, and configured to generate a collection of the instructions based on the recognition codes thus obtained and the instruction lookup table, and to control said mobile unit to perform actions based on the collection of the instructions and the entries of the coordinate information corresponding to the identification codes thus obtained,
   wherein said mobile unit includes
   a main body,
   two moving wheels rotatably installed on said main body,
   two moving motors that are disposed on said main body and that are configured to generate driving power,
   two moving gear sets that are configured to transmit the driving power generated by said moving motors respectively to said two moving wheels,
   at least one interaction gear rotatably installed on said main body,
   at least one interaction motor that is disposed on said main body and that is configured to generate driving power,
   a transmission gear set that is configured to transmit the driving power generated by said at least one interaction motor to said at least one interaction gear, and
   at least one accessory which is separably coupled to said main body and which is to be driven by said at least one interaction motor via said transmission gear set and said at least one interaction gear.

2. The system as claimed in claim 1, wherein said identification pattern and said recognition pattern are to be scanned by means of optical identification (OID), and are printed as optical identifiable patterns of dots.

3. The system as claimed in claim 2, wherein:
   said identification pattern of each of said road pieces includes a plurality of coordinate dots which are printed in rows and columns on said road piece, and which are to be scanned by said optical sensor so as to obtain the entries of the coordinate information; and
   each of the entries of the coordinate information is formatted as coordinates of at least one of the coordinate dots forming a corresponding part of said identification pattern on said road piece in a Cartesian coordinate system.

4. The system as claimed in claim 1, wherein:
   the identification code of one part of said identification pattern of one of said road pieces is further associated with performance of an event by said mobile unit;
   said storage is further configured to store a set of instructions which is generated according to the instruction lookup table and the recognition codes obtained by scanning the recognition patterns on another arrangement of said procedure pieces; and
   said processor is further configured to control said mobile unit to perform the event based on the set of instructions thus stored.

5. The system as claimed in claim 1, wherein said procedure pieces are linearly arranged and each of which is formed with a protrusion and a receptacle at opposite sides of said procedure piece, consecutive two of said procedure pieces being connected with each other via the respective protrusion and receptacle thereof.

6. The system as claimed in claim 1, wherein each of said road pieces is rectangular in shape with four sides, is formed with four engaging convex portions respectively on said four sides, is formed with four engaging concave portions, that correspond in shape to said four engaging convex portions, respectively on said four sides, and is configured to be connected with another one of said road pieces by the engaging convex portion and the engaging concave portion on one of the four sides of said road piece respectively engaging the engaging concave portion and the engaging convex portion on an arbitrary one of the four sides of said another road piece.

7. The system as claimed in claim 1, wherein:
said controller further includes a procedure trigger that is disposed on said mobile unit, that is electrically connected to said processor, and that is configured to be operated to output a procedure trigger signal; and
said processor is configured to switch between performing a first built-in procedure and performing a second built-in procedure in response to receipt of the procedure trigger signal outputted by said procedure trigger, the first built-in procedure to be executed by the processor to control said mobile unit to move along said procedure pieces thus arranged, to scan the recognition patterns on said procedure pieces to obtain the recognition codes, to determine the collection of the instructions corresponding respectively to the recognition codes thus obtained, and to generate a computer program based on the collection of the instructions, the second built-in procedure being executed to control said mobile unit to discard the computer program thus generated.

8. The system as claimed in claim 1, wherein:
said controller further includes a movement trigger that is disposed on said mobile unit, that is electrically connected to said processor, and that is configured to be operated to output a movement trigger signal; and
said processor is configured to execute, in response to receipt of the movement trigger signal outputted by said movement trigger, the collection of the instructions generated based on the recognition codes thus obtained so as to control said mobile unit to move on the road formed by said road pieces.

* * * * *